Oct. 2, 1962    W. CARLS    3,056,421
SOLENOID VALVE HOUSING AND MOUNT
Filed Dec. 21, 1959    2 Sheets-Sheet 1
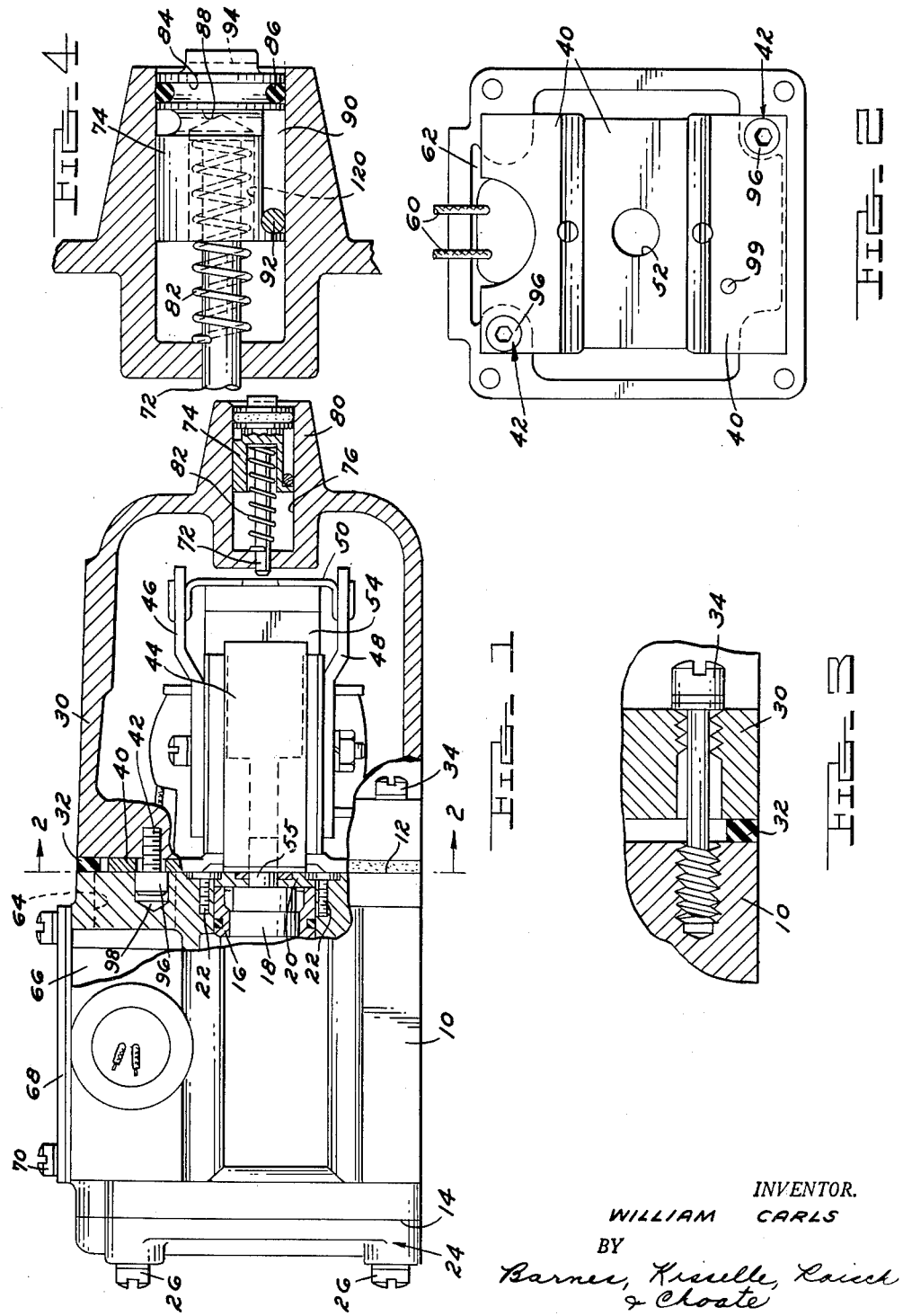
INVENTOR.
WILLIAM CARLS
BY
Barnes, Kisselle, Laick
& Choate
ATTORNEYS Oct. 2, 1962 W. CARLS 3,056,421
SOLENOID VALVE HOUSING AND MOUNT
Filed Dec. 21, 1959 2 Sheets-Sheet 2
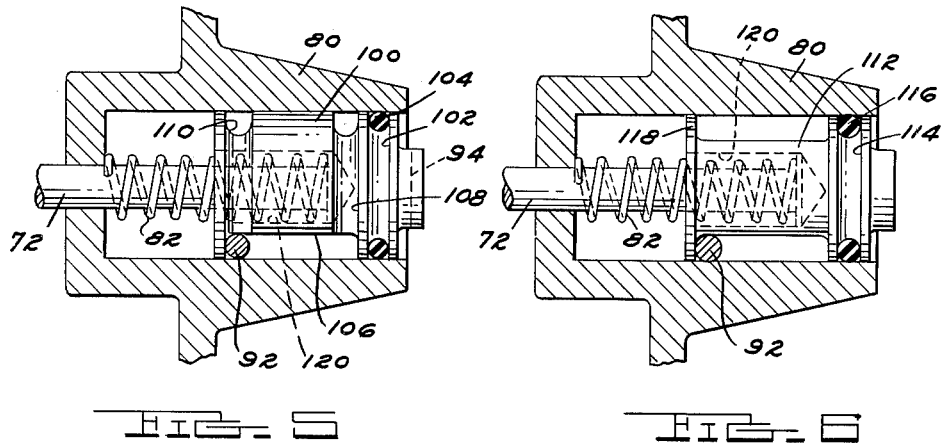
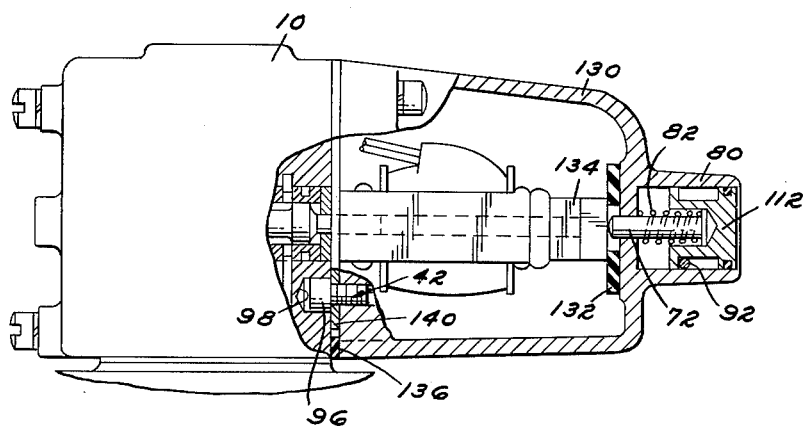
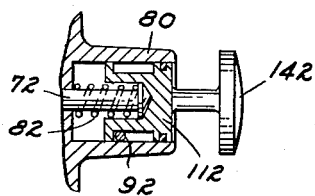
INVENTOR.
WILLIAM CARLS
BY
Barnes, Kisselle, Raisch & Choate
ATTORNEYS

United States Patent Office 3,056,421
Patented Oct. 2, 1962

3,056,421
SOLENOID VALVE HOUSING AND MOUNT
William Carls, Highland, Mich.
Filed Dec. 21, 1959, Ser. No. 860,854
6 Claims. (Cl. 137—315)

This invention relates to a solenoid valve housing and mount.

It is an object of the present invention to provide an improved solenoid mount for a solenoid-operated valve of the type described, for example, in my co-pending application Serial No. 576,990, filed April 9, 1956. As will be seen in the aforesaid application, the valve actuating solenoid construction was mounted on the inside wall of the solenoid housing and a removable cap was placed over the solenoid to close up the housing.

It is an object of the present invention to mount the entire solenoid housing and actuating unit together so that it may be joined as a package unit to the valve housing.

Under these circumstances, if it is necessary to change a solenoid, the entire housing can be readily removed, the solenoid replaced and the housing re-applied without the necessity of getting into the valve housing at all. This cuts down materially the time required for assembly or replacement. In addition the solenoid housing can be fully sealed to the valve housing with a single gasket and it provides in connection with the valve housing a sealed unit for the electrical wiring.

Another object of the invention is a combination solenoid mount and improved valve housing wherein a solenoid can be placed selectively on either end of the valve housing or on both ends or the valve housing can be used with two end plates for pilot control.

Another object of the invention is the provision of a unitary or capsule type of solenoid mount in which all parts are retained when the housing is removed. This facilitates removal and re-assembly of the parts in difficult locations especially in elevated installations where a service man must operate on a ladder.

Another object and feature of the invention is the cooperation between the retaining screws for the solenoid in its own housing and the valve housing per se where the heads of the retaining screws serve as locators for the solenoid and housing, thus insuring accurate positioning and alignment of the solenoid with the valve to be actuated.

Other objects and features of the invention relating to further details of construction and operation will be apparent in the following description and claims.

Drawings accompany the disclosure and the various views thereof may be briefly described as follows:

FIGURE 1, a sectional view of the solenoid housing cover and mount showing the manner in which it is related to the valve housing.

FIGURE 2, a sectional elevation of the solenoid mounting cap on line 2—2 of FIGURE 1.

FIGURE 3, a view showing the holding screws for the solenoid casing.

FIGURE 4, an enlarged view of a special spring biased plunger for actuation or locking of the solenoid.

FIGURE 5, a sectional view of a modified locking plug.

FIGURE 6, a sectional view of a third modification of an actuating plug.

FIGURE 7, a sectioned view of a modified type of solenoid housing.

FIGURE 8, a view showing the adaptation of the actuating plug to a palm button.

Referring to the drawings, in FIGURE 1 a valve housing 10 is shown having a flat face 12 at one end and a flat 14 at the other. A sleeve 16 is sealed by O-rings in a central bore of the valve housing and within the sleeve a valve 18 is slidably mounted, the valve spool being retained by a disc 20 held in place by screws 22. The left-hand end of the valve as shown in FIGURE 1 is closed by an end cap 24 held on by screws 26. The right-hand end of the valve housing is closed by a solenoid housing 30 sealed against the valve housing by a gasket 32 and held against the valve housing by captive screws 34 (FIGURE 3).

A solenoid assembly is fastened to the housing 30 by a flanged plate 40 which extends in both directions up over the face of the housing 30. Cylindrically-headed screws 42 serve to hold the solenoid plate 40 in place. Mounted behind the plate 40 is a solenoid winding and lamination unit 44 having top and bottom plates 46 and 48 connected at the back by a stop plate 50. The plate 40 is apertured at 52 to permit cooperation between the forward end of an armature 54 and a pilot projection 55 on the valve 18, the forward end contacting this projection. The power lines 60 for the armature pass through a port 62 in the forward face of the armature housing formed between the solenoid unit and the side of the housing, these wires passing also through a port 64 into the valve housing which has a chamber 66 for receiving these wires.

The chamber 66 is closed by a plate 68 held on by screws 70, there being suitable openings tapped into the wall of housing 10 or housing 30 for conveying the wires to a power source or throughout a bank of similar valves to a common power source.

The plate 50 is apertured to receive a pin 72 which is recessed in a plunger 74 slidable in a bore 76 of a short cylindrical extension 80 on housing 30. A spring 82 also recessed in plunger 74 urges the head and pin outwardly. The plunger has an annular recess 84 in which is located an O-ring 86 to seal the opening. The plunger also has an annular recess 88 and a side flat 90, each of which cooperate selectively with a retaining chordal cross pin 92. As the parts are viewed in FIGURE 4, the cross pin is acting in the flat 90. If the plunger and pin 72—74 are pushed inwardly and turned, the pin 92 will engage the groove 88 and hold the parts in the inward position. This plunger can be manipulated by a screwdriver slot 94 in the outer end. A simple turn of the plunger 74 will release the head to permit outward motion again by the spring 82.

The above described assembly of the pin and head 72—74 will permit the locking of the solenoid 44 into its inner position by reason of the pin 92 engaging the outer end of the solenoid 54. Also, inward motion of the plunger 74 will effect release of the valve and the solenoid in the event the valve or the solenoid should be momentarily sticking.

As has been noted, the screws 42 have a cylindrical head 96 which is not countersunk into the plate 40 but projects therefrom. The surface of the valve body which faces the solenoid is provided with two recesses 98 which fit the heads 96 of the screws 42 with about .004 of an inch clearance. The heads 96, therefore, serve as pilots for locating the solenoid and the solenoid housing relative to the valve housing 10.

The screws 42 are so located that the valve housing cannot be put on in the wrong direction, and for certain sizes of valves, the screw holes 98 are so positioned that only a properly powered solenoid can be applied to the particular valve housing, thus making it impossible to have an underpowered solenoid for any particular valve. A locating pin may also be used in hole 99 of plate 40.

It will be seen when the four screws 34 are released, these being held captive in the flanges of the housing 30, the entire solenoid assembly removes from the valve housing, making it possible to service the valve readily. If the solenoid must be replaced, it is readily removed from the housing and replaced and the parts re-assembled. There are no loose parts that can escape from a workman as he disassembles the entire unit. It will be seen that solenoid can be placed on both ends of housing 10 if positive actuation is desired in each direction.

Otherwise, the solenoid may be placed on either end of the housing 10 or the housing may be used without a solenoid by putting an end plate 24 on each end and utilizing pilot air for operation. With the housing as described, it is possible to set up the air circuit without the electrical circuit, omitting the solenoids, and to test each of the valves by manual manipulation prior to the time that the solenoids are applied. Once the circuit is found to be accurate, the solenoids may be readily applied to provide the electrical actuation. Also, the pin and plunger 72—74 can be used as described to give manual actuation or locking and spring returned action for manual check. This is particularly important in outside installations which must be frequently checked to determine if functioning is proper.

In FIGURE 5, a cylindrical extension 80 has a plunger 100 having the usual O-ring groove 102 with an O-ring 104 therein. This plunger has a flat 106 formed along one side and two locking grooves 108 and 110 at each end wherein the plunger may be locked relative to the retaining cross pin 92 either in the groove 110 in the "out" position or in the groove 108 in the "in" position.

In FIGURE 6, a third modification of an actuating plunger 112 is shown utilizing an O-ring groove 114 with an O-ring 116 therein, this plunger being a non-locking type in which the plunger is in the form of a spool having an end guide land 118 cooperating with the other end land which forms the groove 114.

In each of the embodiments utilizing the plungers 74, 100 and 112, it will be noticed that the pin 72 projects into a recess 120 in the plungers and that also the spring 82 based at the bottom of the plunger recess around the stem 72 is recessed into the recess 120. This permits the use of a longer spring and prevents jamming of the spring between the plunger and the end of the plunger.

In FIGURE 7, a modified solenoid is shown in the assembly having a housing 130 with the standard projection 80 on the end thereof. This solenoid eliminates the bracket 46 of FIGURE 1 which serves as a stop and provides a cushion ring 132 of neoprene or similar material in the rear of the housing to serve as a shock cushion for the solenoid armature 134.

As in the previous disclosure, the solenoid is mounted on the joining face of the housing 130 where it meets the valve housing so that the entire construction may be removed as a unit. Screw heads 96 locate the solenoid as in FIGURE 1. Also, the sealing is accomplished by the resilient grommet 136 which has a thickness greater than the mounting flange 140 for the solenoid so that there will be a predetermined compression of the gasket in the assembly.

As shown in FIGURE 8, a palm button 142 can be mounted on the end of a plunger 112 to permit manual actuation at any time desired.

I claim:

1. An improvement in a solenoid and valve housing combination, which comprises a valve housing having an end face which exposes one end of a valve bore adapted to hold a valve to be actuated, a solenoid housing of hollow form having only one open end with edges adapted to fit against the end face of said valve housing, a solenoid assembly in said solenoid housing, a solenoid armature in said solenoid housing having a valve actuator means movable within said solenoid housing alignable with the bore of said valve housing, means adjacent the open end of said solenoid housing and accessible only from said open end for locating and affixing the solenoid assembly and armature in the solenoid housing independent of the valve housing, means on said solenoid housing and means on said valve housing for positioning said housings relative to each other to align the valve actuator and the bore of the valve housing, and means for detachably fastening said housings together wherein when detached said housings may be axially separated.

2. A device as defined in claim 1 in which the means for locating and affixing the solenoid assembly relative to the solenoid housing comprises a flange extending over a portion of the open end of the solenoid housing to lie adjacent the end face of the solenoid housing and to overlie the solenoid assembly, and means to fasten said flange to said solenoid housing accessible only from the open end of said solenoid housing, said flange serving to retain said armature in said solenoid housing.

3. A device as defined in claim 1 in which the means to position the solenoid housing relative to the valve housing comprises one or more screws projecting through a portion of the solenoid into the solenoid housing, said screws having heads projecting outwardly from the face of the solenoid housing and apertures formed in the face of said valve housing adapted to receive and locate the heads of said screws, thus to position the solenoid and the solenoid housing accurately relative to the valve housing.

4. A device as defined in claim 1 in which the means for locating and affixing the solenoid assembly relative to the solenoid housing comprises a flange extending over a portion of the open end of the solenoid housing to lie adjacent the end face of the valve housing and to overlie the solenoid assembly, and the means to position the solenoid housing relative to the valve housing comprises one or more screws projecting through said flange into the solenoid housing, said screws having heads projecting outwardly from the face of the solenoid housing, and apertures formed in the face of said valve housing adapted to receive and locate the heads of said screws, thus to position the solenoid and the solenoid housing accurately relative to the valve housing.

5. A device as defined in claim 1 in which a stop means on the solenoid assembly extends to a point transverse of and spaced from the solenoid winding adjacent the closed end of the solenoid housing to serve as a stop for the armature in one of its extreme positions independently of the solenoid housing.

6. An improvement in a solenoid and valve housing combination which comprises a valve housing having an end face which exposes one end of a valve bore adapted to hold a valve to be actuated, a solenoid housing of hollow form having only one open end with edges adapted to fit against portions of the end face of the valve housing, a solenoid assembly in said housing comprising a winding and metal lamination and a supporting flange affixed to said assembly transversely at one end thereof, means mounting said supporting flange to said solenoid housing accessible only at the open end of said housing, an armature in said housing having a valve actuator means movable within said housing and facing the open end of said housing to be alignable with the bore of said valve housing, said solenoid and valve actuator being imprisoned in said solenoid housing by said supporting flange, means on one of said housings for locating said housings relative to each other to align the valve actuator and the valve bore, and means for detachably fastening said housings together.

References Cited in the file of this patent

UNITED STATES PATENTS

| | | |
|---|---|---|
| 1,382,412 | Campbell | June 21, 1921 |
| 2,043,194 | Eggleston | June 2, 1936 |
| 2,404,349 | Brant et al. | July 23, 1946 |
| 2,404,514 | McClure | July 23, 1946 |
| 2,619,986 | Geopfrich | Dec. 2, 1952 |
| 2,853,976 | Gerwig | Sept. 30, 1958 |
| 2,901,677 | Chessman et al. | Aug. 25, 1959 |
| 2,916,019 | Murphy | Dec. 8, 1959 |
| 2,966,891 | Williams | Jan. 3, 1961 |